(12) United States Patent
Katz

(10) Patent No.: US 6,321,082 B1
(45) Date of Patent: Nov. 20, 2001

(54) METHOD AND APPARATUS FOR DIRECTIONAL RADIO COMMUNICATION

(75) Inventor: Marcos Katz, Oulu (FI)

(73) Assignee: Nokia Telecommunications Oy, Nokia Group (FI)

(*) Notice: Subject to any disclaimer, the term of this patent is extended or adjusted under 35 U.S.C. 154(b) by 0 days.

(21) Appl. No.: 09/171,042

(22) PCT Filed: Feb. 13, 1997

(86) PCT No.: PCT/EP97/00663

§ 371 Date: Dec. 29, 1998

§ 102(e) Date: Dec. 29, 1998

(87) PCT Pub. No.: WO98/36595

PCT Pub. Date: Aug. 20, 1998

(51) Int. Cl.$^7$ .................................................. H04Q 7/20
(52) U.S. Cl. .................... 455/422; 455/67.1; 455/517; 455/562
(58) Field of Search .............................. 455/12, 13.3, 65, 455/67.1, 422, 427, 500, 501, 504, 505, 506, 517, 561, 562, 429

(56) References Cited

U.S. PATENT DOCUMENTS

| | | | |
|---|---|---|---|
| 5,231,648 | 7/1993 | Driedger et al. | 375/13 |
| 5,719,583 | * 2/1998 | Kanai | 342/378 |
| 5,815,116 | * 9/1998 | Dunbridge et al. | 342/373 |
| 5,960,350 | * 9/1999 | Schorman et al. | 455/513 |
| 6,006,113 | * 12/1999 | Meredith | 455/562 |

FOREIGN PATENT DOCUMENTS

| | | |
|---|---|---|
| 0647978 A2 | 4/1995 | (EP) . |
| 0729285 A2 | 8/1996 | (EP) . |
| WO 96/37973 | * 11/1996 | (FI) . |
| WO 96/37969 | 11/1996 | (WO) . |

* cited by examiner

Primary Examiner—Nay Maung
Assistant Examiner—L West
(74) Attorney, Agent, or Firm—Perman & Green, LLP

(57) ABSTRACT

A method of directional radio communication in a mobile communication network between a first station (4) and a second mobile station (MS) comprises the following steps. Communication data transmitted by a second station (MS) is received at the first station (4). The communication data can travel via one or more of a plurality of signal paths and is received as a set of signals from one or more of a plurality of different beam directions. A first beam direction corresponding to the beam direction from which a first one of the signals is received by the first station representing a shortest one of the signal paths is determined as is a second beam direction corresponding to the beam direction from which one of the signals having the greatest signal strength is received. Where the first and second beam directions are different, communication data is transmitted from the first station (4) to the second station (MS) in both the first and second beam directions.

11 Claims, 4 Drawing Sheets

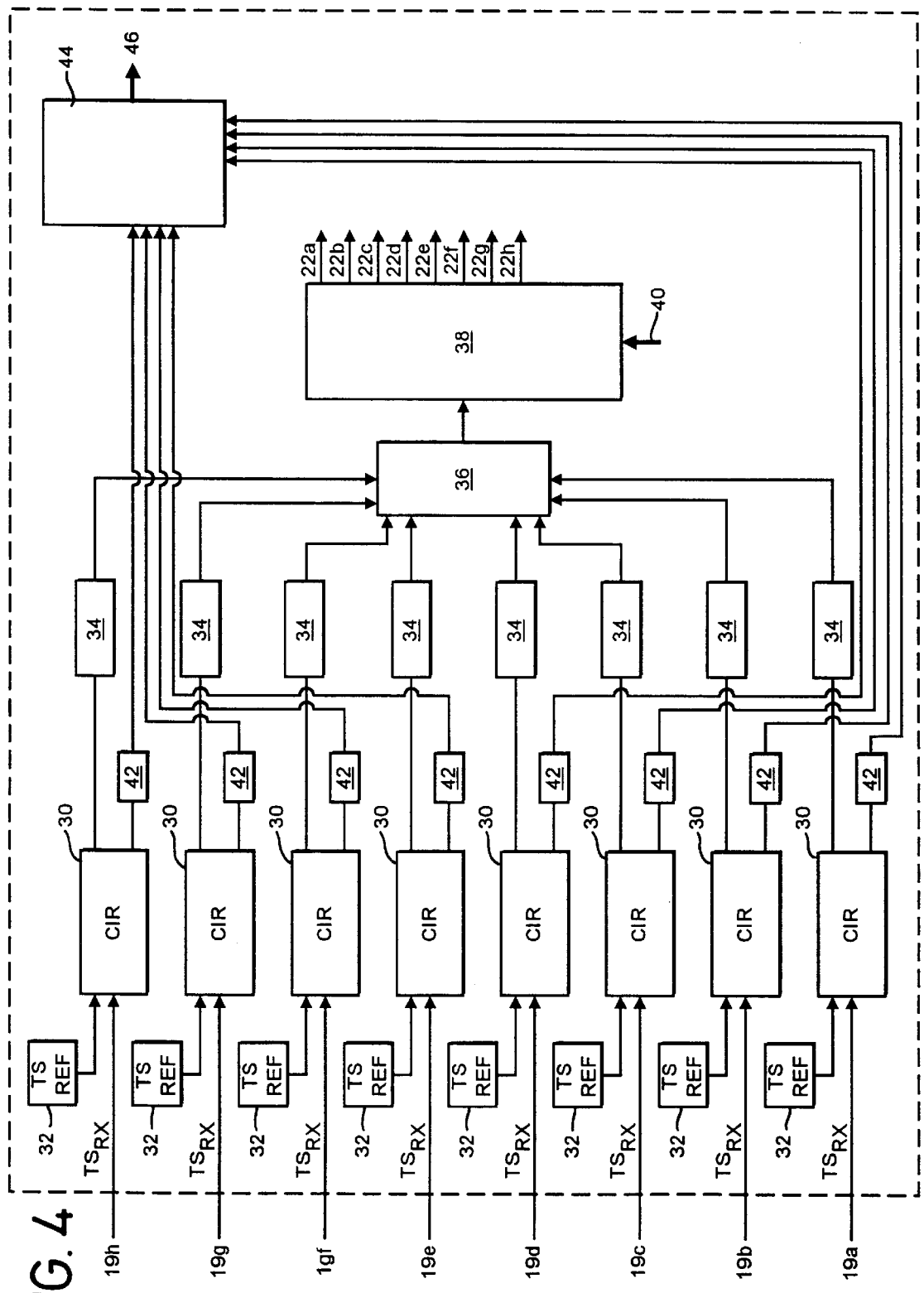

METHOD AND APPARATUS FOR DIRECTIONAL RADIO COMMUNICATION

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the invention

The present invention relates to a method and apparatus for directional radio communication in which signals between a first station and a second station may be transmitted only in certain directions. In particular, but not exclusively, the present invention is applicable to cellular communication networks using space division multiple access.

2. Description of the Related Art Including Information Disclosed Under 37 C.F.R. 1.97 and 1.98.

With currently implemented cellular communication networks, a base transceiver station (BTS) is provided which transmits signals intended for a given mobile station (MS), which may be a mobile telephone, throughout a cell or cell sector served by that base transceiver station. However, space division multiple access (SDMA) systems have now been proposed. In a space division multiple access system, the base transceiver station will not transmit signals intended for a given mobile station throughout the cell or cell sector but will only transmit the signal in the beam direction from which a signal from the mobile station is received. SDMA systems may also permit the base transceiver station to determine the direction from which signals from the mobile station are received.

SDMA systems may allow a number of advantages over existing systems to be achieved. In particular, as the beam which is transmitted by the BTS may only be transmitted in a particular direction and accordingly may be relatively narrow, the power of the transceiver can be concentrated into that narrow beam. It is believed that this results in a better signal to noise ratio with both the signals transmitted from the base transceiver station and the signals received by the base transceiver station. Additionally, as a result of the directionality of the base transceiver station, an improvement in the signal to interference ratio of the signal received by the base transceiver station can be achieved. Furthermore, in the transmitting direction, the directionality of the BTS allows energy to be concentrated into a narrow beam so that the signal transmitted to the BTS can reach far away located mobile stations with lower power levels than required by a conventional BTS. This may allow mobile stations to operate successfully at greater distances from the base transceiver station which in turn means that the size of each cell or cell sector of the cellular network can be increased. As a consequence of the larger cell size, the number of base stations which are required can also be reduced leading to lower network costs. SDMA systems generally require a number of antenna elements in order to achieve the required plurality of different beam directions in which signals can be transmitted and received. The provision of a plurality of antenna elements increases the sensitivity of the BTS to received signals. This means that larger cell sizes do not adversely affect the reception of signals by the BTS from mobile stations.

SDMA systems may also increase the capacity of the system, that is the number of mobile stations which can be simultaneously supported by the system is increased. This is due to the directional nature of the communication which means that the BTS will pick up less interference from mobile stations in other cells using the same frequency. The BTS will generate less interference to other mobile stations in other cells using the same frequency when communicating with a given MS in the associated cell.

Ultimately, it is believed that SDMA systems will allow the same frequency to be used simultaneously to transmit to two or even more different mobile stations which are arranged at different locations within the same cell. This can lead to a significant increase in the amount of traffic which can be carried by cellular networks.

SDMA systems can be implemented in analogue and digital cellular networks and may be incorporated in the various existing standards such as GSM, DCS 1800, TACS, AMPS and NMT. SDMA systems can also be used in conjunction with other existing multiple access techniques such as time division multiple access (TDMA), code division multiple access (CDMA) and frequency division multiple access (FDMA) techniques.

One problem with SDMA systems is that the direction in which signals should be transmitted to a mobile station needs to be determined. In certain circumstances, a relatively narrow beam will be used to send a signal from a base transceiver station to a mobile station. Therefore, the direction of that mobile station needs to be assessed reasonably accurately. As is known, a signal from a mobile station will generally follow several paths to the BTS. Those plurality of paths are generally referred to as multipaths. A given signal which is transmitted by the mobile station may then be received by the base transceiver station from more than one direction due to these multipath effects.

An additional problem is that the direction in which a signal is to be transmitted by the BTS to the mobile station is determined on the basis of the uplink signals received by the BTS from the mobile station. However, the frequencies of the down link signals transmitted from the mobile station to the BTS are different from the frequencies used for the signals transmitted by the BTS to the mobile station. The difference in the frequencies used in the uplink and downlink signals means that the behaviour of the channel in the uplink direction may be different from the behaviour of the channel in the downlink direction. Thus the optimum direction determined for the uplink signals will not always be the optimum direction for the downlink signals.

It is therefore an aim of certain embodiments of the present invention to address these difficulties.

BRIEF SUMMARY OF THE INVENTION

According to a first aspect of the present invention, there is provided a method of directional radio communication in a mobile communication network between a first station and a second mobile station, said method comprising the steps of:

receiving at the first station communication data transmitted by said second station, wherein the communication data can travel via one or more of a plurality of signal paths and is received as a set of signals from one or more of a plurality of different beam directions;

determining a first beam direction corresponding to the beam direction from which a first one of said signals is received by said first station representing a shortest one of said signal paths and a second beam direction corresponding to the beam direction from which one of said signals having the greatest signal strength is received; and where the first and second beam directions are different, transmitting communication data from said first station to said second station in both said first and second beam directions.

By transmitting communication data in both the first and second beam directions, the probability that the signal from the first station will reach the second station is increased. Preferably, the method comprises the step of defining at the first station a plurality of beam directions for transmitting a radiation beam, wherein each of the beam directions is individually selectable.

In the determining step, at least one of the first and second beam directions is determined from the respective channel impulse response. The channel impulse response may be determined for each one of said set of signals. The determined channel impulse responses may then be compared to determine at least one of said first and second beam directions.

The channel impulse response may be determined by correlating a known portion of the communication data in each of the signals received at the first station with a reference version of that known portion.

The method may include the step of monitoring a distance parameter representative of the distance between the first and second stations, whereas if the difference between the first and second stations is less than a predetermined value, the communication data transmitted to the second station is transmitted from the first station to the second station over a multiplicity of beam directions.

Preferably, if the distance between the first and second stations is less than the predetermined value, communication data is transmitted to the second station at a relatively low power level and if the distance is greater than the predetermined value, the communication data is transmitted at a higher power level. Thus, with embodiments of the present invention, if the distance between the first and second station is greater than the critical distance, then communication data will be transmitted in the first and second beam directions at a relatively high power, using a relatively small number of beams. If, on the other hand, the distance between the first and second stations is less than the predetermined distance, then the communication data is transmitted from the first to the second station in a multiplicity of beam directions in order to achieve a wide angular spread. In these latter circumstances, the power level of the communication data transmitted over the multiplicity of beam directions will be relatively low. It should be appreciated that by using low power, the risk of co-channel interference is reduced.

According to a second aspect of the present invention, there is provided a method of directional radio communication in a communication network between a first station and a second station, said method comprising the steps of:

receiving at the first station a first signal transmitted by said second station, said first signal being received from one or more different beam directions;

determining a first beam direction corresponding to the beam direction from which said first signal is first received by said first station and a second beam direction corresponding to the beam direction from which the first signal having the greatest signal strength is received; and transmitting a signal from said first station to said second station in said first and said second beam directions.

According to a third aspect of the present invention, there is provided a first station for directional radio communication in a mobile communication network with a second mobile station, the first station comprising;

receiver means for receiving communication data transmitted by said second station, wherein the communication data can travel via one or more of a plurality of signal paths and is received as a set of signals from one or more of a plurality of different beam directions;

determining means for determining a first beam direction corresponding to the beam direction from which a first one of said signals is received by said station representing a shortest one of said signal paths and a second beam direction corresponding to the beam direction from which one of said signals having the greatest signal strength is received;

transmitter means for transmitting communication data to said second station; and control means for controlling the direction in which the communication data is transmitted, wherein when said first and second beam directions are different, the transmitter means is controlled by the control means to transmit the communication data in the first and second beam directions.

The transmitter means is preferably arranged to provide a plurality of beam directions for transmitting a radiation beam, wherein each of the beam directions is individually selectable.

The transmitter means may comprise an antenna array which is arranged to provide a plurality of beams in a plurality of different directions. The antenna array may be a phased array or alternatively may be an array of individual directional antenna elements. The same antenna array can also be used to receive signals. However, it is appreciated that the receiver means may comprise a separate antenna array.

It should be appreciated that embodiments of the present invention are particularly applicable to cellular communication networks in which the first station is a base station. However, it should be appreciated that embodiments of the present invention have application to other directional radio communication systems.

For a better understanding of the present invention and as to how the same may be carried into effect, reference will now be made by way of example to the accompanying drawings in which:

BRIEF DESCRIPTION OF THE SEVERAL VIEW (S) OF THE DRAWINGS

FIG. 4 shows a schematic view of the digital signal processor of FIG. 2; and

DETAILED DESCRIPTION OF THE INVENTION

Figure 1:
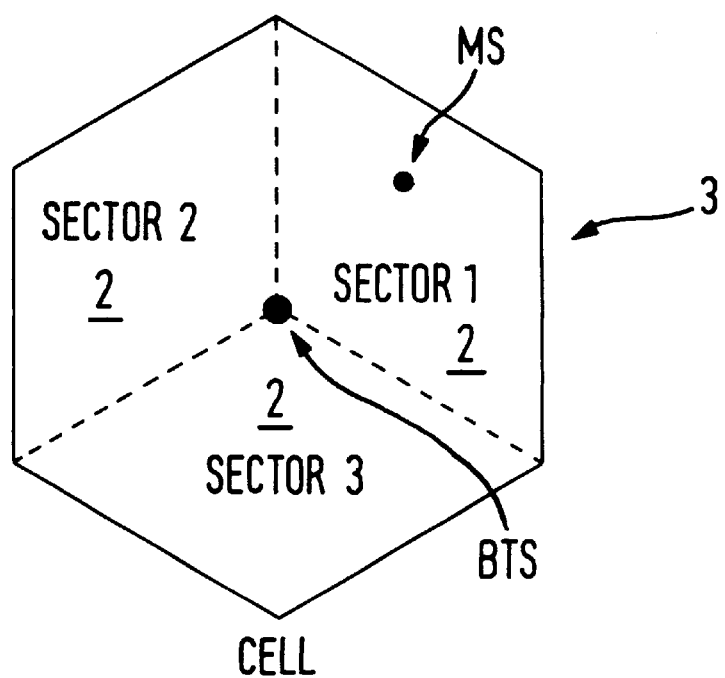
FIG. 1 shows a schematic view of a base transceiver station (BTS) and its associated cell sectors.

Reference will first be made to FIG. 1 in which three cell sectors 2 defining a cell of a cellular mobile telephone network are shown. The three cell sectors 2 are served by respective base transceiver stations (BTS) 4. Three separate base transceiver stations are provided at the same location.

Each BTS 4 has a separate transceiver which transmits and receives signals to and from a respective one of the three sector cell sectors 2. Thus, one dedicated base transceiver station is provided for each cell sector 2. Each BTS 4 is thus able to communicate with mobile stations (MS) such as mobile telephones which are located in respective cell sectors 2.

The present embodiment is described in the context of a GSM (Global System for Mobile Communications) network. In the GSM system, a frequency/time division multiple access F/TDMA system is used. Data is transmitted between the BTS 4 and the MS in bursts. The data bursts include a training sequence which is a known sequence of data. The purpose of the training sequence will be described hereinafter. Each data burst is transmitted in a given frequency band in a predetermined time slot in that frequency band. The use of a directional antenna array allows space division multiple access also to be achieved. Thus, in embodiments of the present invention, each data burst will be transmitted in a given frequency band, in a given time slot, and in a given direction. An associated channel can be defined for a given data burst transmitted in the given frequency, in the given time slot, and in the given direction. As will be discussed in more detail hereinafter, in some embodiments of the present invention, the same data burst is transmitted in the same frequency band, in the same time slot but in two different directions.

Figure 2:
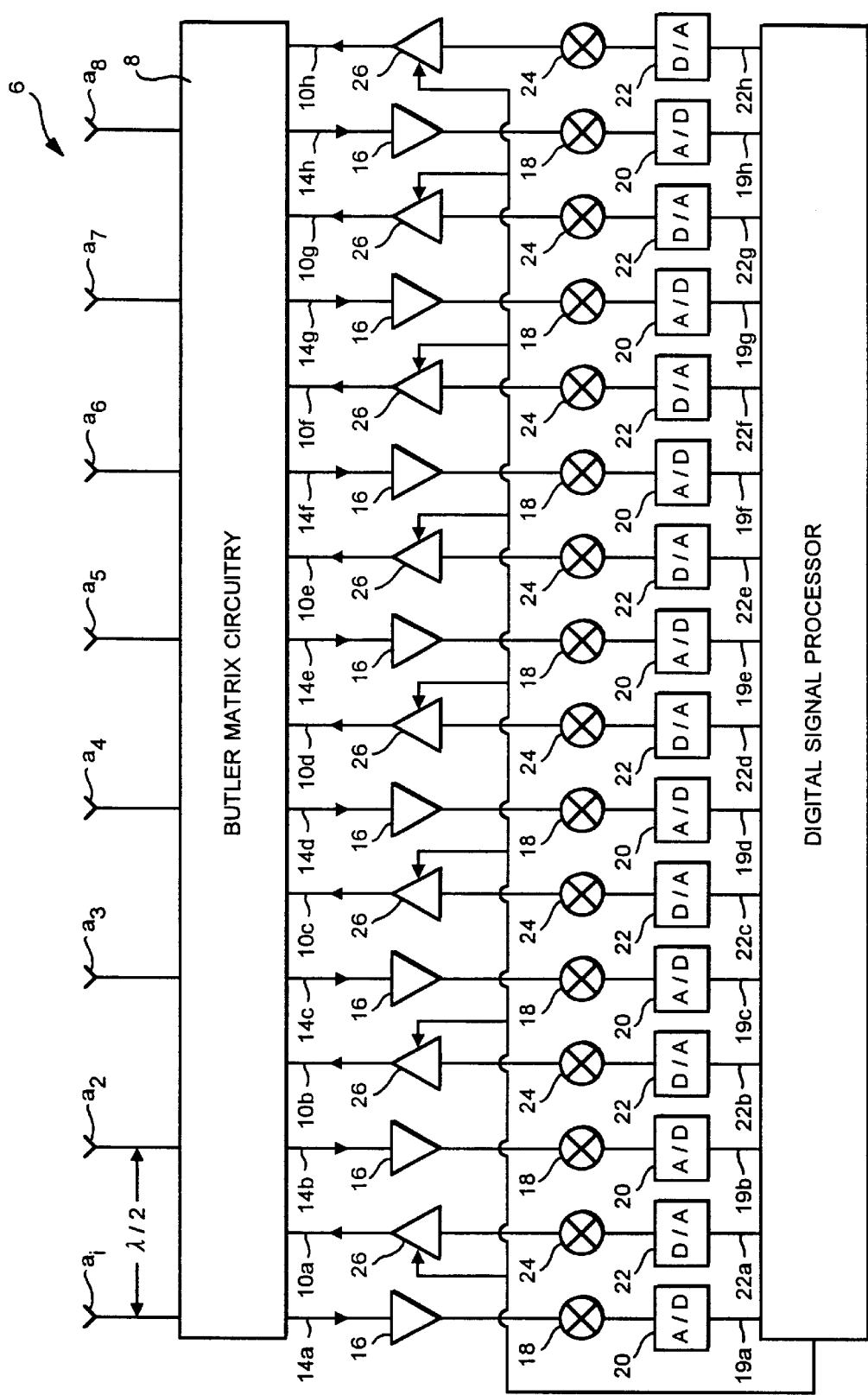
FIG. 2 shows a simplified representation of an antenna array of the base transceiver station.

FIG. 2 shows a schematic view of one antenna array 6 of one BTS 4 which acts as a transceiver. It should be appreciated that the array 6 shown in FIG. 2 only serves one of the three cell sectors 2 shown in FIG. 1. Another two antenna arrays 6 are provided to serve the other two cell sectors 2. The antenna array 6 has eight antenna elements $a_1 \ldots a_8$. The elements $a_1 \ldots a_8$ are arranged to have a spacing of a half wavelength between each antenna element $a_1 \ldots a_8$ and are arranged in a horizontal row in a straight line. Each antenna element $a_1 \ldots a_8$ is arranged to transmit and receive signals and can have any suitable construction. Each antenna element $a_1 \ldots a_8$ may be a dipole antenna, a patch antenna or any other suitable antenna. The eight antenna elements $a_1 \ldots a_8$ together define a phased array antenna 6.

Figure 3:
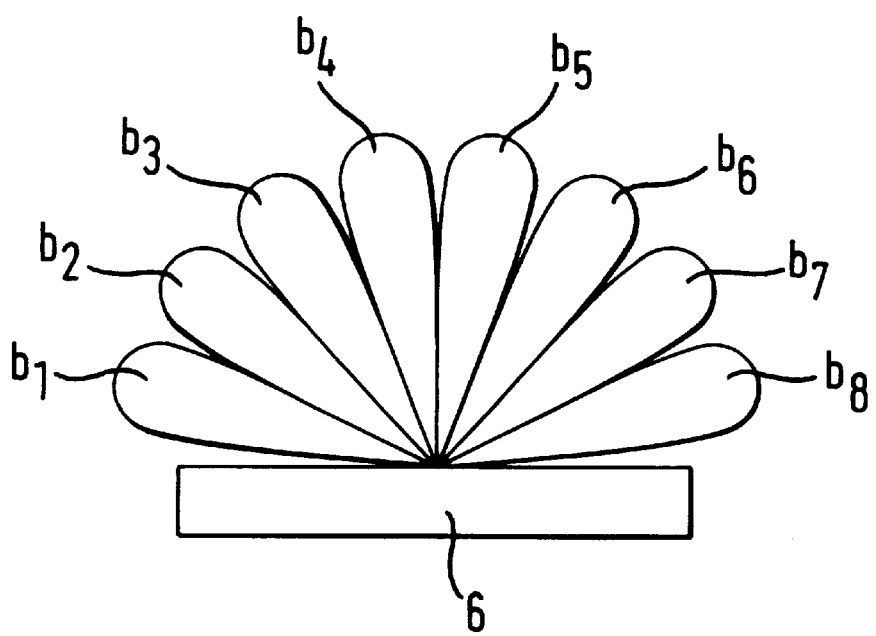
FIG. 3 shows the beam pattern provided by the antenna array of FIG. 2.

As is known, each antenna element $a_1 \ldots a_8$ of the phased array antenna 6 is supplied with the same signal to be transmitted to a mobile station MS. However, the phases of the signals supplied to the respective antenna elements $a_1 \ldots a_8$ are shifted with respect to each other. The differences in the phase relationship between the signals supplied to the respective antenna elements $a_1 \ldots a_8$ gives rise to a directional radiation pattern. Thus, a signal from the BTS 4 may only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element $a_1 \ldots a_8$. In this regard, reference is made to FIG. 3 which illustrates the directional radiation pattern which is achieved with the antenna array 6. The antenna array 6 can be controlled to provide a beam $b_1 \ldots b_8$ in any one of the eight directions illustrated in FIG. 3. For example, the antenna array 6 could be controlled to transmit a signal to a MS only in the direction of beam $b_5$ or only in the direction of beam $b_6$. As will be discussed in further detail hereinafter, it is possible also to control the antenna array 6 to transmit a signal in more than one beam direction at the same time. For example, a signal may be transmitted in the two directions defined by beam $b_5$ and beam $b_6$. FIG. 3 is only a schematic representation of the eight possible beam directions which can be achieved with the antenna array 6. In practice, however, there will in fact be an overlap between adjacent beams to ensure that all of the cell sector 2 is served by the antenna array 6.

The relative phase of the signal provided at each antenna element $a_1 \ldots a_8$ is controlled by Butler matrix circuitry 8 so that a signal can be transmitted in the desired beam direction or directions. The Butler matrix circuitry 8 thus provides a phase shifting function. The Butler matrix circuitry 8 has eight inputs 10a–h from the BTS 4 and eight outputs, one to each antenna element $a_1 \ldots a_8$. The signals received by the respective inputs 10a–h comprise the data bursts to be transmitted. Each of the eight inputs 10a–h represents the beam direction in which a given data burst could be transmitted. For example, when the Butler matrix circuitry 8 receives a signal on the first input 10a, the Butler matrix circuitry 8 applies the signal provided on input 10a to each of the antenna elements $a_1 \ldots a_8$ with the required phase differences to cause beam $b_1$ to be produced so that the data burst is transmitted in the direction of beam $b_1$. Likewise, a signal provided on input 10b causes a beam in the direction of beam $b_2$ to be produced and so on.

As already discussed, the antenna elements $a_1 \ldots a_8$ of the antenna array 6 receive signals from a MS as well as transmit signals to a MS. A signal transmitted by a MS will generally be received by each of the eight antenna elements $a_1 \ldots a_8$. However, there will be a phase difference between each of the signals received by the respective antenna elements $a_1 \ldots a_8$. The Butler matrix circuitry 8 is therefore able to determine from the relative phases of the signals received by the respective antenna elements $a_1 \ldots a_8$ the beam direction from which the signal has been received. The Butler matrix circuitry 8 thus has eight inputs, one from each of the antenna elements $a_1 \ldots a_8$ for the signal received by each antenna element. The Butler matrix circuitry 8 also has eight outputs 14a–h. Each of the outputs 14a to 14h corresponds to a particular beam direction from which a given data burst could be received. For example, if the antenna array 6 receives a signal from a MS from the direction of beam $b_1$, then the Butler matrix circuitry 8 will output the received signal on output 14a. A received signal from the direction of beam $b_2$ will cause the received signal to be output from the Butler matrix circuitry 8 on output 14b and so on. In summary, the Butler matrix circuitry 8 will receive on the antenna elements $a_1 \ldots a_8$ eight versions of the same signal which are phase shifted with respect to one another. From the relative phase shifts, the Butler matrix circuitry 8 determines the direction from which the received signal has been received and outputs a signal on a given output 14a–h in dependence on the direction from which the signal has been received.

It should be appreciated that in some environments, a single signal or data burst from a MS may appear to come from more than one beam direction due to reflection of the signal whilst it travels between the MS and the BTS 4, provided that the reflections have a relatively wide angular spread. The Butler matrix circuitry 8 will provide a signal on each output 14a–h corresponding to each of the beam directions from which a given signal or data burst appears to come. Thus, the same data burst may be provided on more than one output 14a–h of the Butler matrix circuitry 8. However, the signal on the respective outputs 14a–h may be time delayed with respect to each other.

Each output 14a–h of the Butler matrix circuitry 8 is connected to the input of a respective amplifier 16 which amplifies the received signal. One amplifier 16 is provided for each output 14a–h of the Butler matrix circuitry 8. The amplified signal is then processed by a respective processor 18 which manipulates the amplified signal to reduce the frequency of the received signal to the baseband frequency so that the signal can be processed by the BTS 4. To achieve this, the processor 18 removes the carrier frequency component from the input signal. Again, one processor 18 is provided for each output 14a–h of the Butler matrix circuitry 8. The received signal, which is in analogue form, is then converted into a digital signal by an analogue to digital (A/D) converter 20. Eight A/D converters 20 are provided, one for each output 14a–h of the Butler matrix circuitry 8. The digital signal is then input to a digital signal processor 21 via a respective input 19a–h for further processing.

The digital signal processor 21 also has eight outputs 22a–h, each of which outputs a digital signal which represents the signal which is to be transmitted to a given MS. The output 22a–h selected represents the beam direction in which the signal is to be transmitted. That digital signal is converted to an analogue signal by a digital to analogue (D/A) converter 23. One digital to analogue converter 23 is provided for each output 22a–h of the digital signal processor 21. The analogue signal is then processed by processor 24 which is a modulator which modulates onto the carrier frequency the analogue signal to be transmitted. Prior to the processing of the signal by the processor 24, the signal is at the baseband frequency. The resulting signal is then amplified by an amplifier 26 and passed to the respective input 10a–h of the Butler matrix circuitry 8. A processor 24 and an amplifier 26 are provided for each output 22a–h of the digital signal processor 21.

Reference will now be made to FIG. 4 which schematically illustrates the digital signal processor 21. It should be appreciated that the various blocks illustrated in FIG. 4 do not necessarily correspond to separate elements of an actual digital signal processor 21 embodying the present invention. In particular, the various blocks illustrated in FIG. 4 correspond to various functions carried out by the digital signal processor 21. In one embodiment of the present invention, the digital signal processor 21 is at least partially implemented in integrated circuitry and several functions may be carried out by the same element.

Each signal received by the digital signal processor 21 on the respective inputs 19a–h is input to a respective channel impulse response (CIR) estimator block 30. The CIR estimator block 30 includes memory capacity in which the received signal is temporarily stored and also memory capacity for storing the estimated channel impulse response. The channel impulse response estimator block 30 is arranged to calculate the channel impulse response of the channel of the respective input 19a–h. As already discussed an associated channel can be defined for the given data burst transmitted in the selected frequency band, the allocated time slot and the beam direction from which the signal is received. The beam direction from which a signal is received is ascertained by the Butler matrix circuitry 8 so that a signal received at input 19a of the digital signal processor represents mainly the signal that has been received from the direction of beam $b_1$ and so on. It should be appreciated that the signal received at a given input may also include the side lobes of the signal received on, for example, adjacent inputs.

Each data burst which is transmitted from a mobile station MS to the BTS 4 includes a training sequence TS. However, the training sequence $TS_{RX}$ which is received by the BTS 4 is affected due to noise and also due to multipath effects which leads to interference between adjacent bits of the training sequence. This latter interference is known as intersymbol interference. $TS_{RX}$ is also affected by interference from other mobile stations, for example mobile stations located in other cells or cell sectors using the same frequency which may cause co-channel interference. As will be appreciated, a given signal from the MS may follow more than one path to reach the BTS and more than one version of the given signal may be detected by the antenna array 6 from a given direction. The training sequence $TS_{RX}$ which is received from input 19a is cross-correlated by the CIR estimator block 30 with a reference training sequence $TS_{REF}$ stored in a data store 32. The reference training sequence $TS_{REF}$ is the same as the training sequence which is initially transmitted by the mobile station. In practice the received training sequence $TS_{RX}$ is a signal modulated onto a carrier frequency while the reference training sequence $TS_{REF}$ is stored as a bit sequence in the data store 32. Accordingly, before the cross-correlation is carried out, the stored reference training sequence is similarly modulated. In other words the distorted training sequence received by the BTS 4 is correlated with the undistorted version of the training sequence. In an alternative embodiment of the invention, the reference training sequence is demodulated prior to its correlation with the reference training sequence. In this case, the reference training sequence would again have the same form as the received training sequence. In other words, the reference training sequence is not modulated.

The reference training sequence $TS_{REF}$ and the received training sequence $TS_{RX}$ each are of length L corresponding to L bits of data and may for example be 26 bits. The exact location of the received training sequence $TS_{RX}$ within the allocated time slot may be uncertain. This is because the distance of the mobile station MS from the BTS 4 will influence the position of the data burst sent by the MS within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n may be 7 or 9. It is preferred that n be an odd number. The n correlations will typically be on either side of the maximum obtained correlation. The relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations gives rise to a tap sequence having n values.

Figure 5:
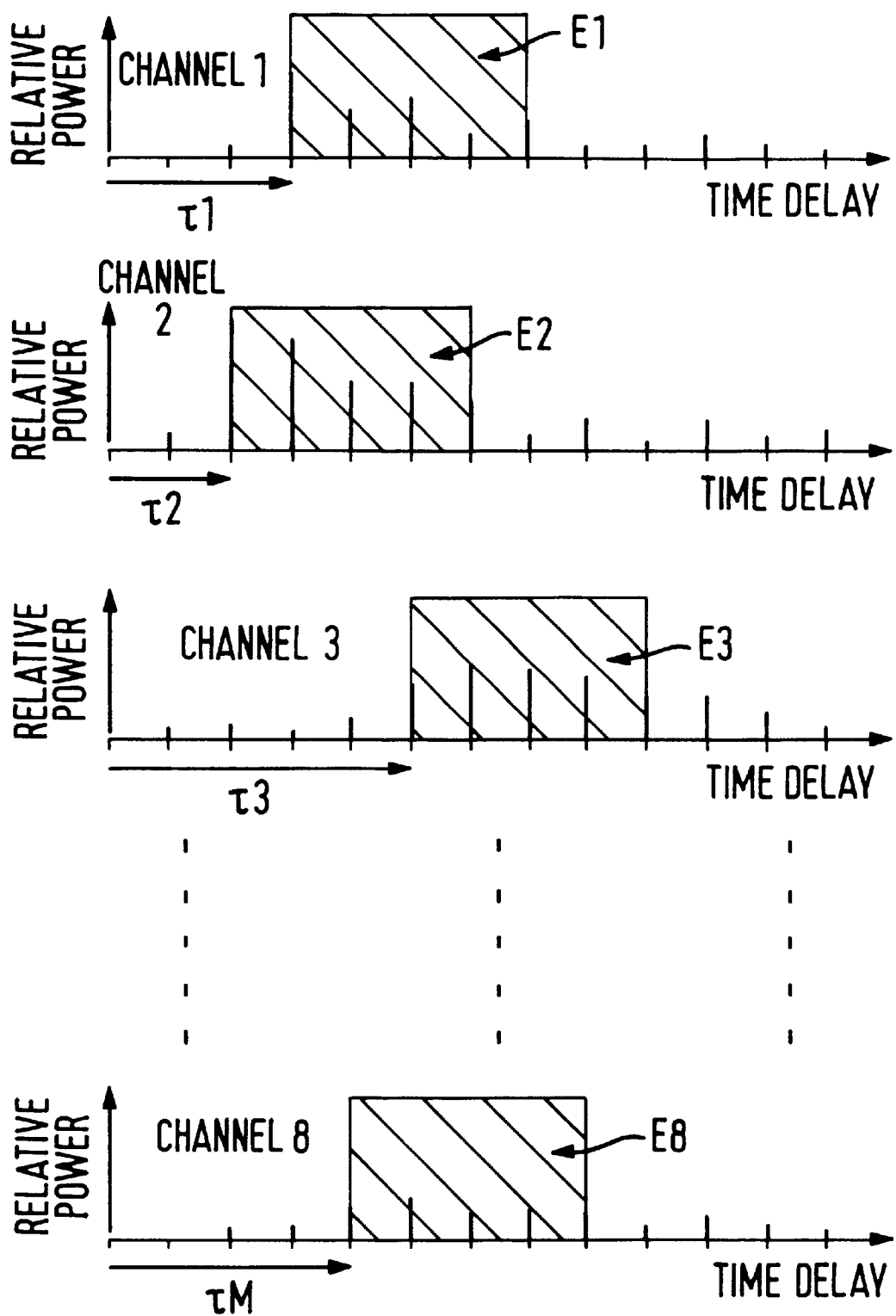
FIG. 5 illustrates the channel impulse response for four channels, out of the eight channels.

Reference is now made to FIG. 5 which shows the channel impulse response for four of the eight possible channels corresponding to the eight spacial directions. In other words, FIG. 5 shows the channel impulse response for four channels corresponding to a given data burst received in four of the eight beam directions from the mobile station, the data burst being in a given frequency band and in a given time slot. The x axis of each of the graphs is a measure of time delay whilst the y axis is a measure of relative power. Each of the lines (or taps) marked on the graph represents the multipath signal received corresponding to a given correlation delay. Each graph will have n lines or taps, with one tap corresponding to each correlation.

From the estimated channel impulse response, it is possible to determine the location of the training sequence within the allotted time slot. The largest tap values will be obtained when the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. The maximum energy for a given channel is calculated as follows:

$$E = \sum_{j=1}^{5} (h_j)^2 \qquad (I)$$

where h represents the tap amplitude resulting from a cross correlation of the reference training sequence $TS_{REF}$ with the received training sequence $TS_{RX}$. The CIR estimator block 30 estimates the maximum energy for a given channel by using a sliding window technique. In other words, the CIR estimator block 30 considers each set of five adjacent values and calculates the energy from those five values. The five adjacent values giving the maximum energy are selected as representative of the impulse response of that channel.

The energy can be regarded as being a measure of the strength of the desired signal from a given MS received by the BTS 4 from a given direction. This process is carried out for each of the eight channels which represent the eight different directions from which the same data burst could be received. The signal which is received with the maximum energy has followed a path which provides the minimum attenuation of that signal.

An analysis block 34 is provided which stores the maximum energy calculated by the CIR estimator block 30 for the respective channel for the five adjacent values selected by the CIR estimator block as being representative of the channel impulse response. The analysis block 34 may also analyse the channel impulse responses determined by the CIR estimator block 30 to ascertain the minimum delay. The delay is a measure of the position of the received training sequence $TS_{RX}$ in the allotted time slot and hence is a relative measure of the distance travelled by a signal between the mobile station and the BTS 4. The channel with the minimum delay has the signal which has travelled the shortest distance. This shortest distance may in certain cases represent the line of sight path between the mobile station MS and the BTS 4.

The analysis block 34 is arranged to determine the position of the beginning of the window determining the five values providing the maximum energy. The time delay is then determined based on the time between a reference point and the beginning of the window. That reference point may be the time when the training sequences in each branch start to be correlated, the time corresponding to the earliest window edge of all the branches or a similar common point. In order to accurately compare the various delays of the different channels, a common timing scale is adopted which relies on the synchronisation signal provided by the BTS 4 in order to control the TDMA mode of operation. In other words, the position of the received training sequence $TS_{RX}$ in the allotted time slot is a measure of the time delay. It should be appreciated that in known GSM systems, the delay for a given channel is calculated in order to provide timing advance information. Timing advance information is used to ensure that a signal transmitted by the mobile station to the BTS falls within its allotted time slot. The timing advance information can be determined based on the calculated relative delay and the current timing advance information. If the mobile station MS is far from the base station, then the MS will be instructed by the BTS to send its data burst earlier than if the mobile station MS is close to the BTS.

The results of the analysis carried out by each of the analysis blocks 34 are input to a comparison block 36. The comparison block 36 compares the maximum energy determined for each channel and also compares the determined delay for each channel. The comparison block 36 ascertains which channel has the maximum energy for a given data burst in a given frequency band in a given time slot. This means that the beam direction from which the strongest version of a given data burst is received can be ascertained. The comparison block 36 also ascertains which of the channels has a minimum delay. In other words, the channel having the data burst which has followed the shortest path can also be ascertained.

The comparison block 36 then checks to see whether or not the channel having the maximum energy is the same as the channel having the minimum delay. If these channels are the same the comparison block 36 outputs a signal to generating block 38 indicating that the next signal to the mobile station MS in question should be transmitted in the single beam direction from which the signal having the greatest strength and shortest path has been received.

If, however, the channel which has the strongest signal is not the same as the channel which first reaches the BTS 4, the comparison block 36 outputs a signal to generating block 38 indicating that the next signal to be transmitted to the mobile station MS, from which the data burst has been received, should be transmitted in two beam directions. One direction will correspond to the beam direction from which the strongest signal is received and the other direction will correspond to the beam direction from which the data burst is first received. For example, if the comparison block 36 ascertains that the strongest signal has been input to the digital signal processor 21 on input 19b whilst the signal which first reaches the BTS 4 has been input to the digital signal processor 21 via input 19d, the signal from the BTS to the mobile station would be transmitted in the directions of beams $b_2$ and $b_4$. In those circumstances, the signal to be transmitted would be output on outputs 22b and 22d of the digital signal processor 21.

The above described embodiment is particularly appropriate for those situations where the mobile station is located relatively far from the BTS, that is greater than a critical distance. This critical radius is dependent on the environment of each individual cell and may typically be around 0.5 to 1 km. When the distance between the BTS and the MS is greater than the critical distance, the bulk of the energy received from the MS is distributed among a relatively few beam directions. In particular, the energy will be mainly concentrated in one or two beams, or possibly three beam directions. However, when the distance between the mobile station and the BTS is less than the critical distance, the received desired energy will appear in general to be distributed among a much greater number of beams. Accordingly, in embodiments of the present invention, the selection of the beams based on the maximum signal strength and minimum delay may only be used in those situations where the distance between the MS and the BTS 4 is greater than the critical distance. When the distance between the MS and the BTS is less than the critical distance, the BTS 4 will transmit signals to the MS over a relatively large number of beam directions, for example 4 or more. The power level used when transmitting over a relatively wide angular spread will generally be lower than the power used in the or each beam direction when the distance between the MS and the BTS 4 is greater than the critical distance.

Any suitable method can be used to determine whether or not the distance between the MS and the BTS is greater than the critical distance. In one embodiment, the comparison block 36 compares the channel impulse response obtained for each of the possible directions. If most of the received energy is distributed in three or less beam directions, then it is assumed that the distance between the BTS and MS is greater than the critical distance. Alternatively, if most of the received energy is received from 4 or more beam directions, then it is assumed that the distance between the MS and the BTS is less than the critical distance. It is also possible for the comparison block to use the timing advance information in order to determine whether or not the distance between the MS and BTS is greater or less than the critical distance. This method is preferred in some embodiments of this invention as it gives more accurate results than the previously outlined method.

Generating block 38 is responsible for generating the signals which are to be output from the digital signal processor 21. The generating block 38 has an input 40 representative of the speech and/or information to be transmitted to the mobile station MS. Generating block 38 is responsible for encoding the speech or information to be sent to the mobile station MS and includes a training sequence and a synchronising sequence within the signals. Block 38 is also responsible for production of the modulating signals. Based on the generated signal and determined beam direction, generating block 38 provides signals on the respective outputs 22a–h of the digital signal processor 21. The generating block 38 also provides an output 50 which is used to control the amplification provided by amplifiers 24 to ensure that the signals in the various beam directions have the required power levels.

The output of the channel impulse response estimator block 30 is also used to equalise and match the signals received from the mobile station MS. In particular, the effects of intersymbol interference resulting from multipath propagation can be removed or alleviated from the received signal by the matched filter (MF) and equalizer block 42. It should be appreciated that the matched filter (MF) and equalizer block 42 has an input (not shown) to receive the received signal from the MS. The output of each block 42 is received by recovery block 44 which is responsible for recovering the speech and/or the information sent by the MS. The steps carried out by the recovery block include demodulating and decoding the signal. The recovered speech or information is output on output 48.

It should be appreciated that whilst the above described embodiment has been implemented in a GSM cellular communication network, it is possible that the present invention can be used with other digital cellular communication networks as well as analogue cellular networks. The above described embodiment uses a phased array having eight elements. It is of course possible for the array to have any number of elements. Alternatively, the phased array could be replaced by discrete directional antennae each of which radiates a beam in a given direction. The Butler matrix circuitry can be replaced by any other suitable phase shifting circuitry, where such circuitry is required. The Butler matrix circuitry is an analogue beam former. It is of course possible to use a digital beam former DBF or any other suitable type of beam former. The array may be controlled to produce more than eight beams, even if only eight elements are provided, depending on the signals supplied to those elements.

It is also possible for a plurality of phased arrays to be provided. The phased arrays may provide a different number of beams. When a wide angular spread is required, the array having the lower number of elements is used and when a relatively narrow beam is required, the array having the larger number of elements is used.

As will be appreciated, the above embodiment has been described as providing eight outputs from the Butler matrix circuitry. It should be appreciated that in practice a number of different channels will be output on each output of the Butler matrix at the same time. Those channels may be different frequency bands. The channels for different time slots will also be provided on the respective outputs. Whilst individual amplifiers, processors, analogue to digital converters and digital to analogue converters have been shown, these in practice may be each provided by a single element which has a plurality of inputs and outputs.

It should be appreciated that embodiments of the present invention have applications other than just in cellular communication networks. For example, embodiments of the present invention may be used in any environment which requires directional radio communication. For example, this technique may be used in PMR (Private Radio Networks) or the like.

What is claimed is:

1. A method of directional radio communication in a mobile communication network between a first station and second mobile station, said method comprising the steps of:

receiving at the first station communication data transmitted by said second station, wherein the communication data can travel via one or more of a plurality o signal paths and is received as a set of signals from one or more of a plurality of different beam directions;

determining a first beam direction corresponding to the beam direction from which a first one of said signals is received by said first station representing a shortest one of said signal paths and a second beam direction corresponding to the beam direction from which one of said signals having the greatest signal strength is received; and where the first and second beam directions re different, transmitting communication data from said first station to said second station in both said first and said second beam directions.

2. A method as claimed in claim 1, comprising the step of defining at the first station a plurality of beam directions for transmitting a radiation beam, wherein each of said beam directions is individually selectable.

3. A method as claimed in claim 1, wherein in said determining step, at least one of said first and second beam directions is determined from the respective channel impulse response.

4. A method as claimed in claim 3, wherein the channel impulse response is determined for each one of said set of signals, the determined channel impulse responses being compared to determine at least one of said first and second beam directions.

5. A method as claimed in claim 1, including the step of monitoring a distance parameter representative of the distance between said first and second stations, wherein if the distance between said first and second stations less than a predetermined value, the communication data transmitted to said second station is transmitted from said first station to said second station in a multiplicity of beam directions.

6. A method as claimed in claim 5, wherein if the distance between said first and second stations is less than said predetermined value, the communication data is transmitted to said second station at a relatively low power level and if the distance is greater than said predetermined value, the communication data is transmitted at a higher power level.

7. A method as claimed in claim 1, wherein said communication network is a cellular network and said first station is a base transceiver station.

8. A method of directional radio communication in a communication network between a first station and a second station, said method comprising the steps of:
   receiving at the first station a first signal transmitted by said second station, said first signal being received as a set of signals from one or more different beam directions;
   determining a first beam direction corresponding to the beam direction from which a first one of said set of signals is first received by said first station and a second beam direction corresponding to the beam direction from which one of the set of signals having the greatest signal strength is received; and
   transmitting a signal from said first station to said second station in said first and said second beam directions.

9. A first station for directional radio communication in a mobile communication network with a second mobile station, the first station comprising:
   receiver means for receiving communication data transmitted by said second station, wherein the communication data can travel via one or more of a plurality of signal paths and is received as a set of signals from one or more of a plurality of different beam directions;
   determining means for determining a first beam direction corresponding to the beam direction from which a first one of said signals is received by said station representing a shortest one of said signal paths and a second beam direction corresponding to the beam direction from which one of said signals having the greatest signal strength is received;
   transmitter means for transmitting communication data to said second station; and
   control means for controlling the direction in which the communication data is transmitted, wherein when said first and second beam directions are different, the transmitter means is controlled by the control means to transmit the communication data in the first and second beam directions.

10. A first station as claimed in claim 9, wherein said transmitter means is arranged to provide a plurality of beam directions for transmitting a radiation beam, wherein each of said beam directions is individually selectable.

11. A first station as claimed in claim 9, wherein each said transmitter means comprises an antenna array which is arranged to provide a plurality of beams in a plurality of different directions.

* * * * *